(12) United States Patent
Tsai

(10) Patent No.: US 8,401,378 B2
(45) Date of Patent: *Mar. 19, 2013

(54) FLASH CONTROL FOR ELECTRONIC ROLLING SHUTTER

(75) Inventor: Richard Tsai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/438,726

(22) Filed: Apr. 3, 2012

(65) Prior Publication Data

US 2012/0188426 A1    Jul. 26, 2012

Related U.S. Application Data

(63) Continuation of application No. 12/823,762, filed on Jun. 25, 2010, now Pat. No. 8,150,255.

(51) Int. Cl.
G03B 9/70    (2006.01)
(52) U.S. Cl. .................................................. 396/180
(58) Field of Classification Search .................. 396/180
See application file for complete search history.

(56) References Cited

U.S. PATENT DOCUMENTS

| | | | |
|---|---|---|---|
| 7,038,820 B1 | 5/2006 | Kindt et al. |
| 7,099,056 B1 | 8/2006 | Kindt |
| 7,142,234 B2 | 11/2006 | Kaplinsky et al. |
| 7,333,145 B2 | 2/2008 | Poplin |
| 7,427,736 B2 | 9/2008 | Xu et al. |
| 7,528,866 B2 | 5/2009 | Kaplinsky et al. |
| 7,605,852 B2 | 10/2009 | Olsen et al. |
| 7,705,910 B2 | 4/2010 | Toyoda et al. |
| 7,949,249 B2 | 5/2011 | Gai et al. |
| 8,150,255 B2 * | 4/2012 | Tsai .............................. 396/180 |
| 2003/0007088 A1 | 1/2003 | Rantanen |
| 2005/0178950 A1 | 8/2005 | Yoshida |
| 2008/0245952 A1 | 10/2008 | Troxell et al. |
| 2009/0091652 A1 | 4/2009 | Wernersson |
| 2009/0136225 A1 | 5/2009 | Gai et al. |
| 2009/0160944 A1 | 6/2009 | Trevelyan et al. |
| 2009/0305739 A1 | 12/2009 | Gavelle et al. |
| 2010/0026853 A1 | 2/2010 | Mokhnatyuk |
| 2010/0165180 A1 | 7/2010 | Park et al. |
| 2010/0171875 A1 | 7/2010 | Yamamoto |

OTHER PUBLICATIONS

Bradley, Derek et al., "Synchronization and Rolling Shutter Compensation for Consumer Video Camera Arrays", Proceedings of International Workshop on Projector-Camera (PROCAMS), 2009, Miami, USA, 8 pages.

* cited by examiner

Primary Examiner — Rodney Fuller
(74) Attorney, Agent, or Firm — Blakely, Sokoloff, Taylor & Zafman LLP

(57) ABSTRACT

A method performed by an electronic camera in flash mode is as follows. A scene ambient lighting indication is obtained. An integration time interval and a flash pulse-on time interval for taking a picture is then set. The set integration time interval is shorter when the indication is bright than when the indication is dark; and the set flash pulse-on time interval is longer when the indication is bright than when the indication is dark. An image is captured using the set integration time interval and the set flash pulse-on time interval in accordance with an electronic rolling shutter (ERS). Other embodiments are also described and claimed.

20 Claims, 5 Drawing Sheets

FLASH CONTROL FOR ELECTRONIC ROLLING SHUTTER

This application is a continuation of U.S. application Ser. No. 12/823,762 file on Jun. 25, 2010, which issued as U.S. Pat. No. 8,150,255 on Apr. 3, 2012.

An embodiment of the invention relates generally to consumer electronic devices having a microelectronic image sensor array and associated imaging optics (referred to here as a digital camera or electronic camera), and more particularly to techniques for controlling an LED-based camera flash in an electronic rolling shutter (ERS) camera. Other embodiments are also described.

BACKGROUND

In photography, a camera flash is used to improve image picture quality in low light situations, by illuminating the scene with a burst or pulse of visible light while a picture of the scene is taken. For many portable multifunction devices or "mobile devices", such as smart phones and cellular camera phones, a desirable choice for an integrated flash light source is the light emitting diode (LED) lamp. An LED flash has a small form factor (thereby able to fit more easily in a relatively small mobile device), and can provide continuous illumination at relatively low power (for capturing video). In a typical setting, an LED flash is pulsed on, or remains turned on, for the entire duration of an image-framing period (also referred to as a single exposure or shutter cycle for taking a picture).

In the case of an electronic rolling shutter (ERS) camera, the image framing period is skewed or stretched in time, as depicted in FIG. 2. That is because with ERS, the entire image sensor array is not reset at once, but rather staggered on a row-by-row basis. FIG. 2 depicts a continuous sequence of ERS exposures and associated flash control signal timing for two types of flash mechanisms that are currently available. For a given exposure K, a complete exposure interval (or image-framing period) starts at $T_1$ and ends at $T_4$. The next exposure K+1 begins at $T_4$, whereas the previous exposure K−1 ended at $T_1$. A typical range for the period $T_4$-$T_1$ may be 200-300 milliseconds. In a typical scenario, exposure begins at $T_1$ with row 1 of the sensor array being reset and then allowed to integrate or collect photo-generated charges; this continues for the duration of a row integration time interval, ending at $T_3$. A short delay thereafter, referred to as a row processing delay, the second row is reset and allowed to integrate. This procedure continues sequentially until the last row, row N, has been reset and allowed to integrate. The output signals from the sensors of each row may also be read or measured in a staggered manner, beginning with the first row at $T_3$ and ending with the last row, row N, at approximately $T_4$.

As depicted in FIG. 2, the LED flash is only turned on for the time interval $T_2$ until $T_3$. This time interval is referred to as the ERS row overlap interval (for a given exposure). During the ERS row overlap interval, all rows of the image sensor are integrating or collecting photo-generated charges (for capturing the scene). Note that in contrast to the LED flash, a gas discharge lamp would only need a very short pulse to illuminate the scene during the row overlap interval, due to its substantially greater light output.

SUMMARY

An embodiment of the invention is an electronic with electronic rolling shutter (ERS), having an exposure controller that can automatically set an integration time interval and a flash pulse-on time interval for a given exposure in accordance with at least two different scenarios, namely one for a "dark" scene and one for a "bright" scene. Note that the references to dark and bright are only relative to each other and are not otherwise limiting. In both of those scenarios, the camera has determined (either automatically or via manual user input) that flash illumination is to be applied when taking a picture of a particular scene. The exposure controller then automatically sets the integration time interval and the associated flash pulse width in accordance with the following algorithm: the integration time interval is shorter when the indication is bright than when the indication is dark, and the flash pulse width is longer when the indication is bright than when the indication is dark. This algorithm balances the need for obtaining good resolution of the foreground in the scene and minimizing the flash mechanism's power consumption, while taking advantage of a flash mechanism that may be based on an LED lamp, rather than a gas discharge lamp.

The ERS has a row overlap time interval, which depends on the set integration time interval. In one embodiment of the invention, the set flash pulse width is longer than this row overlap interval when the indication is bright, and shorter than the row overlap interval when the indication is dark.

In ERS also has an exposure complete time interval (also referred to as the image framing period) that also depends on the set integration time interval. In another embodiment of the invention, the set flash pulse width is as long as this exposure complete time interval when the indication is bright, and shorter than the exposure complete time interval when the indication is dark. In a further aspect of this embodiment, the set flash pulse width also is longer than the row overlap interval when the indication is dark.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
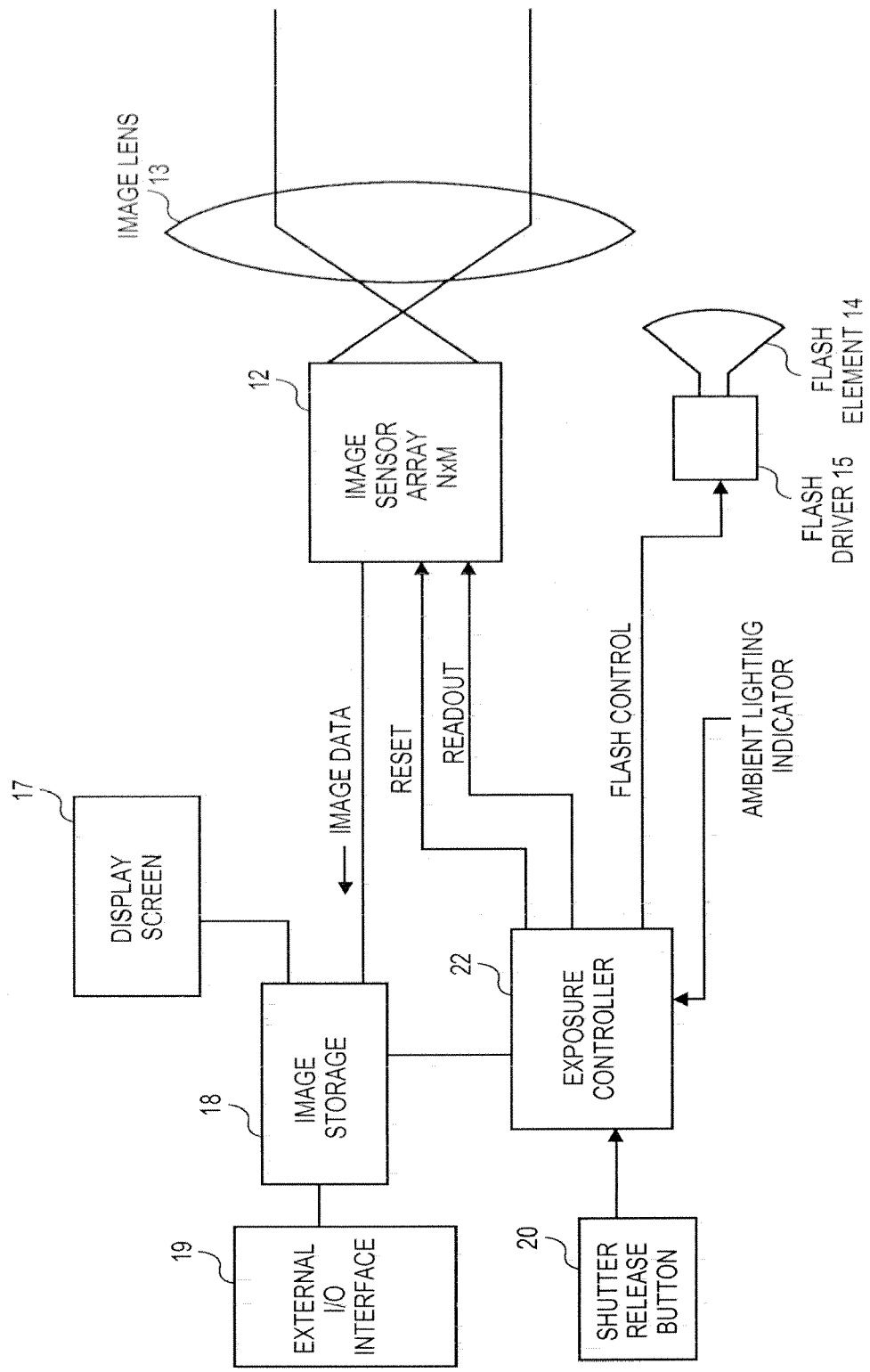
FIG. 1 is a block diagram of a camera, in accordance with an embodiment of the invention.
Figure 2:
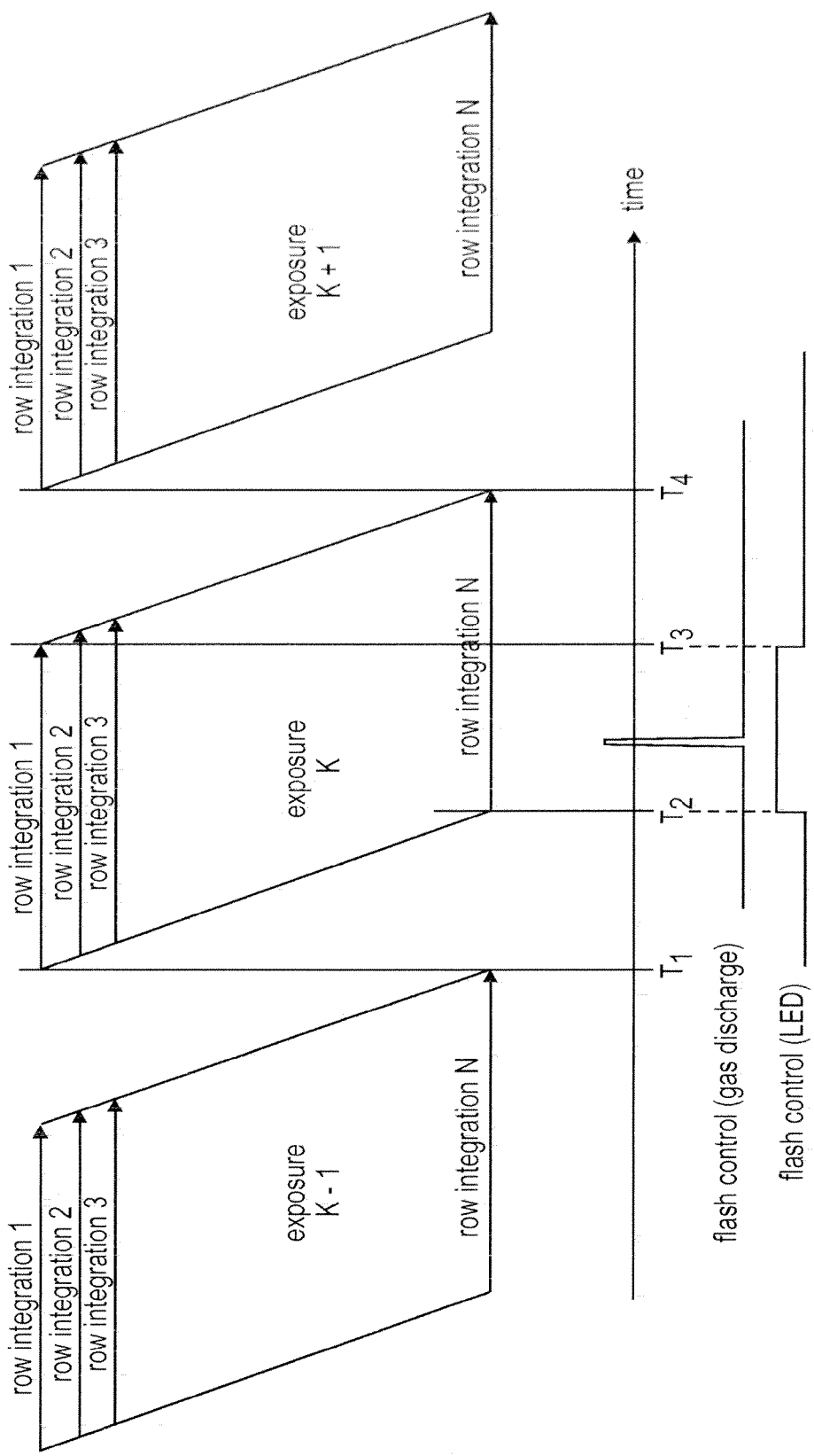
FIG. 2 depicts a sequence of ERS exposures and their associated flash control signal timing.

FIG. 1 is a block diagram of a camera 10 in accordance with an embodiment of the invention. The camera may be integrated or built into any one of several different types of consumer electronic devices, including, for instance, a multi-function art phone, such as an iPhone™ device by Apple Inc., a mobile camera phone or cellular camera phone, a dedicated digital camera, a notebook or laptop personal computer, and a desktop personal computer. The camera has an image sensor array 12 which may be a two dimensional array of N×M microelectronic photocells arranged as N rows and M columns. This is a microelectronic device on which light, from the scene to be captured, impinges, as gathered or guided by an imaging lens 13. The image sensor 12 is thus said to lie at the focal plane of the imaging lens 13. The imaging lens 13 may be part of a more complex optical subsystem that may include a light filter, a variable iris or aperture, a zoom mechanism, and an autofocus mechanism all of which may help enhance the picture. Note that in this embodiment, there may be no need for a mechanical shutter as the image sensor array 12 is operated in accordance with an electronic rolling shutter (ERS).

The image sensor array 12 responds to the incident light and collects photo-generated charge or forms image signals, during a row integration interval. At the end of the row integration interval, image signals from a given row of photocells are read (e.g., by being sampled and held and then digitized) and transferred to image storage 18. Control signals that govern this part of the capture process include a reset signal that prepares a row of photocells for the start of the integration interval, and a readout signal which ends the integration interval and may signal the readout and transfer of the captured row data to the image storage 18. The latter may be any conventional form of data storage device suitable for storage of digital images, e.g. a non-volatile random access memory module. Once the image data has been captured and stored in the image storage 18, the latter may be accessed so as to display the picture on a display screen 17 to be viewed by the user, e.g. during a camera playback mode of the camera 10. In addition, the camera 10 has an external I/O interface 19 through which the image data of a given picture may be transferred out of the camera. For instance, the external I/O interface 19 may include a Universal Serial Bus (USB) interface or a high definition multimedia interface (HDMI); the interface 19 may be shared by other functions of a multi-function device in which the camera 10 is integrated, e.g. synchronization or docking with desktop computer, and charging the battery using an external power source. The taken pictures may be transferred as still image files or as video files depending on how they were taken, to be stored for instance in a desktop computer or in a Web-based picture album, or otherwise shared with others.

The exposure controller 22 manages the process of taking pictures in the camera 10. The controller 22 may be implemented as a combination of programmed data processing components, memory and hardwired logic circuitry (e.g., a "programmed processor"). The controller 22 generates various commands that are signaled to the components of the camera 10, including reset and readout commands to the image sensor array 12, where these are in response to a shutter release button 20 being actuated by a user of the camera. The shutter release button 20 may be a physical button and mechanical switch combination that is typically exposed on the outside surface of a consumer electronics device having a camera function, or it may be a virtual button displayed on a touch screen of the consumer electronics device. The exposure controller 22 also receives, as a further input, an ambient light indicator signal, which provides an indication of the level of ambient light in the scene of which a picture is to be taken, i.e. when the scene is "dark" or "bright". In one embodiment, the indicator is derived automatically by the controller in response to the output data of a light sensor that is aimed at the scene. The light sensor may be a part of the image sensor array 12 whose image data is processed during a viewfinder mode of operation, for example, to derive an indication of the ambient light level; alternatively, the light sensor may be in a separate microelectronic die whose output data is processed by the controller 22 to calculate an indication of whether the scene is dark or bright. As yet another alternative, the indicator may be provided as a user settable (user interface-based) indicator; in other words, the indicator may be manually set by the user to indicate bright or dark as desired by the user.

A flash mechanism may be integrated into the same housing in which the other components of the camera 10 and the consumer electronics device are built. It includes a flash element 14 which is the actual light source or lamp such as one or more LED lamps, and a flash driver 15 which is a circuit that is designed to provide the needed drive signals to the flash element 14, in response to receiving an input control signal from the exposure controller 22. The control signal may specify the flash pulse-on interval as well as a flash pulse amplitude or strength level.

As introduced above, the controller 22 responds to the ambient lighting indicator by controlling the flash mechanism of the camera 10, in situations where flash illumination is desired, to provide two distinct modes or states associated with a dark scene and a bright scene. The latter, even though referred to here as a "bright" scene, is one that despite having some ambient lighting in the scene nevertheless will benefit from flash illumination to better resolve an object in the foreground; for instance, while the background of the scene may be brightly lit, an object in the foreground may not be and, as such, will benefit from being illuminated by the flash mechanism.

In a general sense, the controller 22 sets the flash pulse-on time interval and the associated integration time interval for taking a given picture, based on the following protocol: a) when a bright scene is indicated, the integration interval is set to be shorter than if a dark scene were indicated; and b) when a bright scene is indicated, the flash pulse-on time interval is set to be longer than a dark scene were indicated. FIGS. 3-6 describe at least two instances of this general case.

Figure 3:
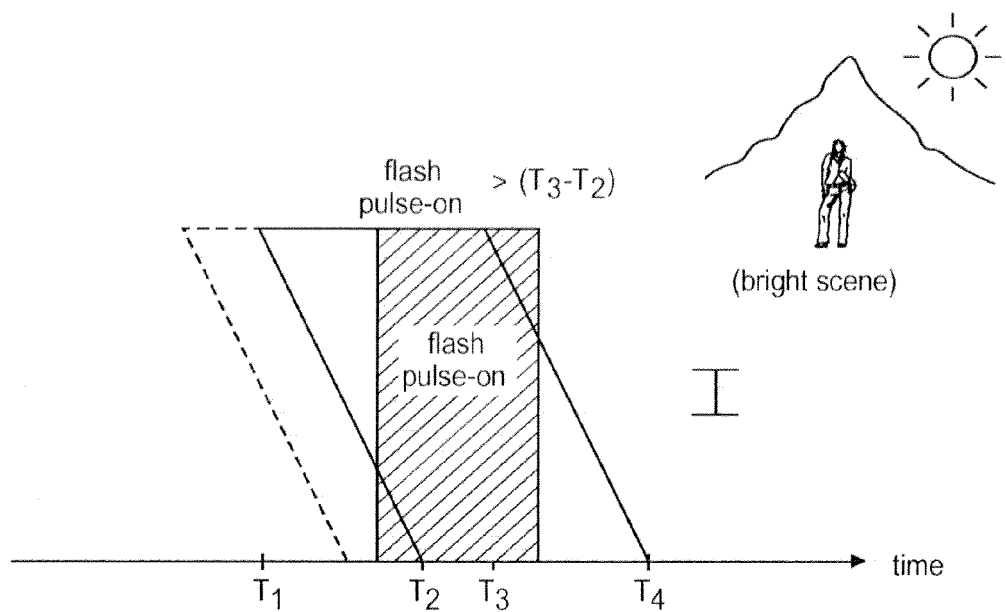
FIG. 3 depicts example timing for an ERS exposure of a bright scene, with an associated flash pulse-on interval.
Figure 4:
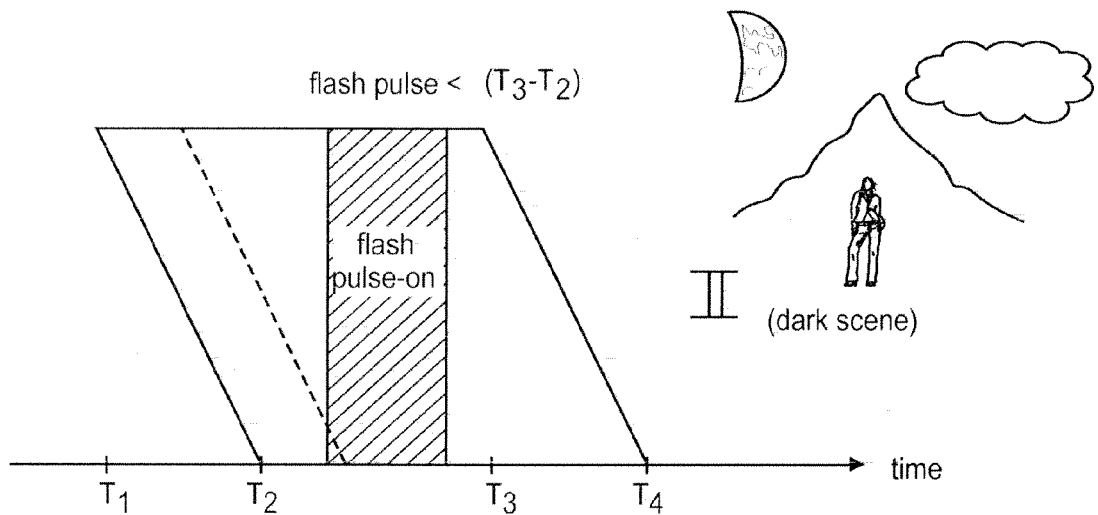
FIG. 4 depicts example timing for an ERS exposure of a dark scene.

A first instance of how to set the ERS integration interval and associated flash pulse width in accordance with an embodiment of the invention is described using FIGS. 3 and 4. FIG. 3 depicts an ERS exposure timing for a bright scene, in which the integration time interval has been shortened relative to a default or "normal" interval (depicted as dotted lines). In contrast, FIG. 4 depicts the timing for a dark scene, in which the integration time interval is longer than the normal or default. Note that in each diagram, $T_1$ represents the start of the image-framing period (complete exposure interval) and $T_4$ represents its end, while $T_2$ is the point at which all rows of the image sensor are integrating or collecting photo-generated charge and $T_3$ represents the point in time at which the first row has stopped integrating and is being read out. The time interval between $T_2$ and $T_3$ is referred to as the overlap interval, and the time interval between $T_1$ and $T_4$ is referred to as the complete or full exposure interval.

FIG. 3 also shows that when a bright scene is indicated, the controller sets the flash pulse-on interval to be longer than the row overlap time interval ($T_3$-$T_2$). However, when a dark scene is indicated, referring now to FIG. 4, the controller sets the flash pulse-on interval to be shorter than the row overlap time interval. Note also that the flash pulse width is centered in the image-framing period.

The rationale behind the two conditions of FIG. 3 and FIG. 4 may be explained as follows. In both cases, the foreground, which is close enough to be illuminated by the flash and includes a person in this instance, needs to be sufficiently dominated by the flash, in order to have a consistent picture from scene to scene. In the bright scene (1), the background is relatively bright (due to higher ambient lighting), such that a shorter integration interval can be selected. However because of the shorter integration interval, a longer flash pulse is needed to properly illuminate the foreground being captured. In contrast to FIG. 3, FIG. 4 shows a dark scene (II) where the background lighting is less intense such as on a cloudy day or in the evening with a bright moon behind the subject, and the controller responds to this by setting a longer integration time interval to adequately resolve all of the detail in the scene. In addition, to better capture the foreground, the flash pulse-on interval is made shorter than the row overlap interval. Note however that in order to properly expose the foreground subject (in this case the face of a person standing) in the dark scene (II) using this technique in which the flash pulse width is smaller than the overlap interval ($T_3$-$T_2$), the background should still be brighter than the subject's face.

For the case where the controller 22 automatically selects the bright or dark scene indicator, the thresholds for defining these indications may be determined at the time of development of the camera 10. Laboratory experimentation may be performed with a test scene under several different levels of ambient light from very bright to very dark (yet still requiring a flash). Pictures of the test scene are evaluated to determine at what point, that is at what threshold ambient lighting level, the integration time should be made longer as the ambient lighting drops while at the same time decreasing the flash pulse-on interval to not overexpose the foreground.

Figure 5:
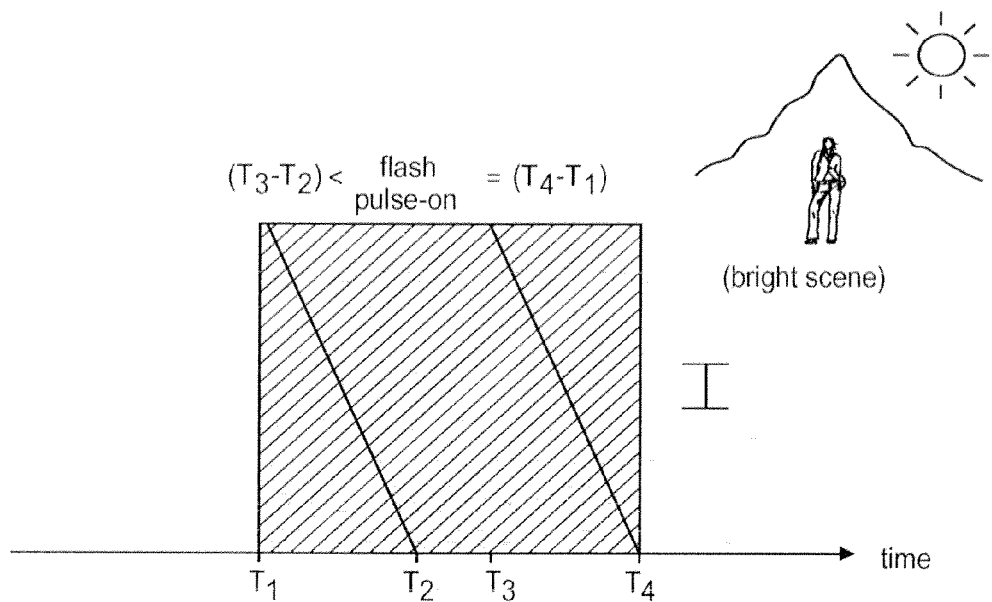
FIG. 5 depicts example timing of another ERS exposure for which the flash pulse-on interval is as long as the image-framing period when a bright scene is being indicated.
Figure 6:
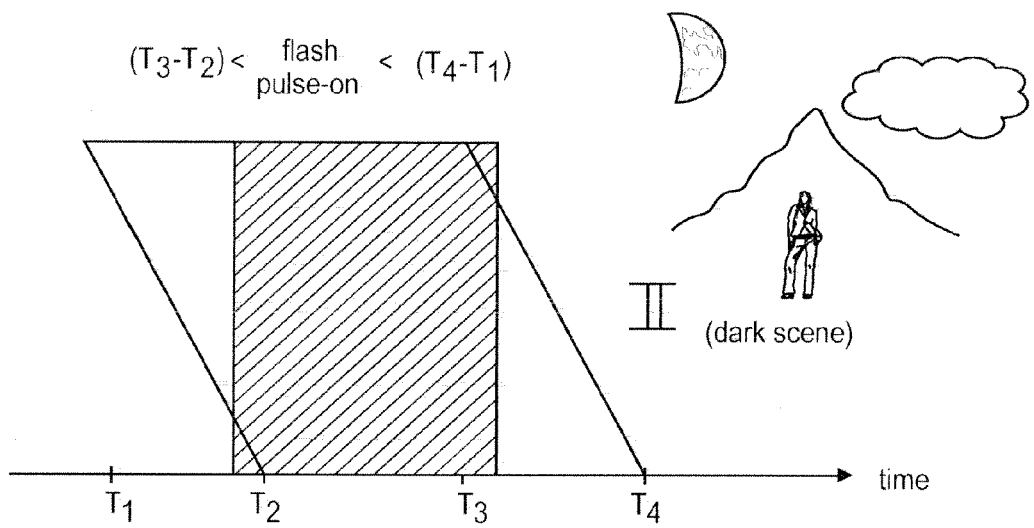
FIG. 6 depicts example timing of an ERS exposure for which the flash pulse-on interval is longer than the overlap interval but shorter than the image-framing period when a dark scene is being indicated.

Turning now to FIGS. 5-6, these depict another embodiment of the invention, where again the ERS exposures are shown for bright and dark indicated scenes. In this case, however, the controller has set the flash pulse-on interval in the case of a bright scene to be as long as the exposure complete time interval ($T_4$-$T_1$). For instance, it may be that a particularly short integration time interval has been set, thereby requiring that the flash be turned on for the entire duration of the picture framing period to adequately expose the foreground. When the scene is indicated to be dark, the integration time is lengthened and the flash pulse-on interval is set to be shorter than the complete exposure interval, but longer than the row overlap time interval. This may be due to a shorter integration interval having been selected than was in the case of FIG. 4.

Figure 7:
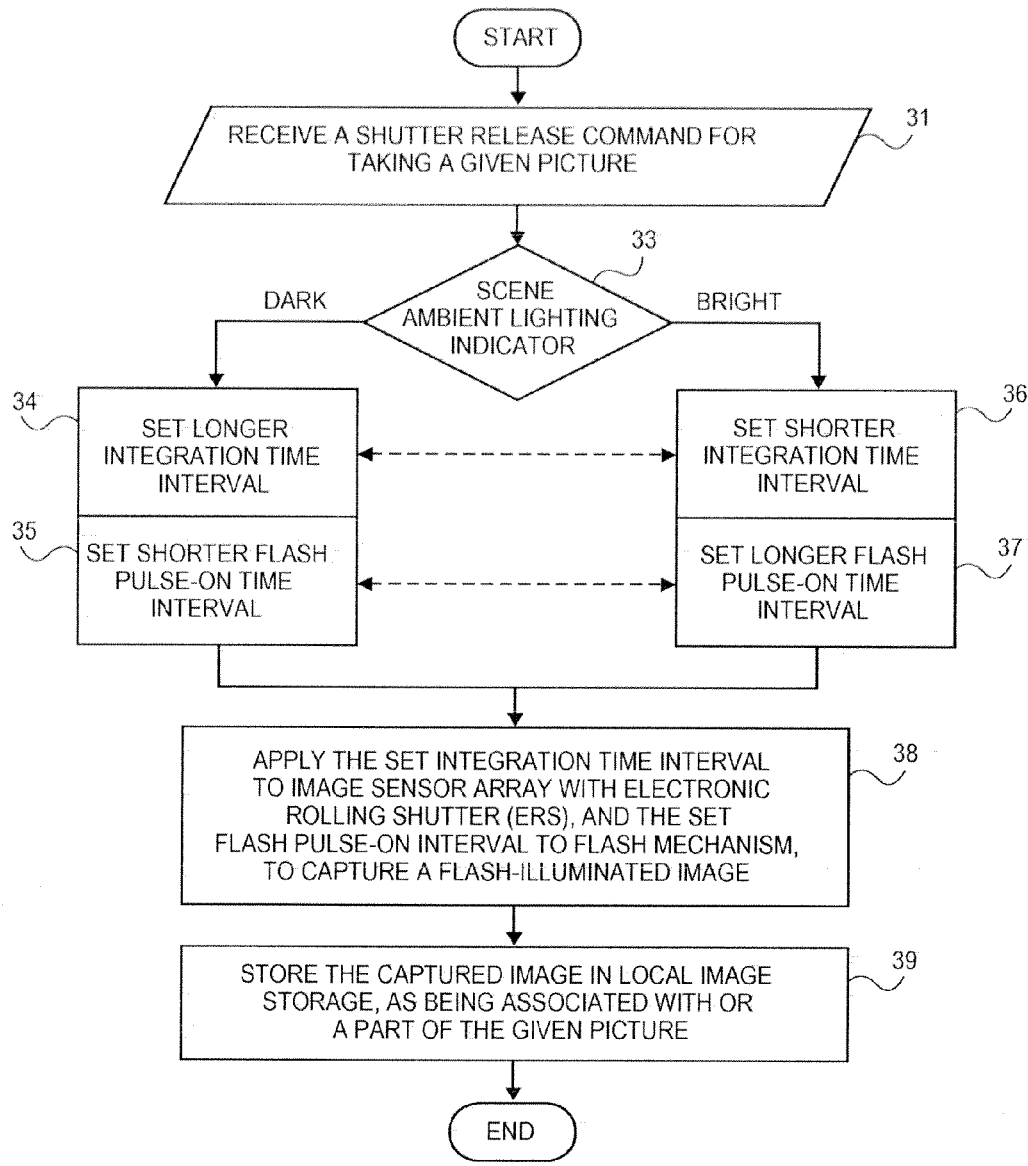
FIG. 7 is a flow diagram of a process for taking a picture using an ERS image sensor array, in accordance with an embodiment of the invention.

FIG. 7 is a flow diagram of a process for taking a picture using an ERS image sensor array, in accordance with an embodiment of the invention. A machine-implemented method performed by an electronic camera under flash illumination is depicted, where operation may begin with a shutter release command being received for taking a picture (block 31). The picture may be a still image or it may be part of a video sequence. The process continues with a scene ambient lighting indicator being checked (block 33). If a dark scene is indicated, then a longer integration time interval is set together with a shorter flash pulse width (blocks 34, 35). On the other hand, if a bright scene is indicated, then a shorter integration time interval is set together with a longer flash pulse width. The set integration time interval is applied to the image sensor array, as is the flash pulse width to the flash mechanism to capture an image (block 38). The captured image is then stored in local image storage as being associated with or a part of the given picture (e.g., in a still image file or as a frame in a video file).

In one embodiment, the set flash pulse-on interval is longer than the row overlap interval when the indication is bright, and shorter than the row overlap interval when the indication is dark. In another embodiment, the set flash pulse-on interval is as long as the exposure complete time interval when the indication is bright, and shorter than the exposure complete time interval when the indication is dark. More particularly in that case, the set flash pulse-on interval can be longer than the row overlap time interval when the indication is dark.

To conclude, various aspects of a technique for operation of an ERS camera in flash mode has been described. While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the techniques are described as being suitable for use with a flash mechanism that is based on an LED lamp, the invention may alternatively be deployed with other light sources that have similar output intensity characteristics, which are suitable for use in a digital camera. Also, while the ERS exposure timings depicted in FIGS. 3-6 all have fixed integration intervals (row-by-row), an alternative is to vary the integration intervals as between rows so as to compensate for extremely bright or extremely dark regions of the scene. The description is thus to be regarded as illustrative instead of limiting.

What is claimed is:

1. A machine-implemented method performed by an electronic camera, comprising:
obtaining a scene ambient lighting indication for taking a picture of a scene; and
automatically setting an integration time interval and a flash pulse-on time interval for taking the picture, wherein
the set integration time interval is shorter when the indication is bright than when the indication is dark, and
the set flash pulse-on time interval is longer when the indication is bright than when the indication is dark, and
capturing a flash-illuminated image using the set integration time interval and the set flash pulse-on time interval through a shutter.

2. The method of claim 1 wherein the shutter has a row overlap time interval that depends on the set integration time interval,
and wherein the set flash pulse-on interval is longer than the row overlap interval when the indication is bright, and shorter than the row overlap interval when the indication is dark.

3. The method of claim 1 wherein the shutter has an exposure complete time interval that depends on the set integration time interval,
and wherein the set flash pulse-on interval is as long as the exposure complete time interval when the indication is bright, and shorter than the exposure complete time interval when the indication is dark.

4. The method of claim 3 wherein the shutter has a row overlap time interval that depends on the set integration time interval,
and wherein the set flash pulse-on interval is longer than the row overlap time interval when the indication is dark.

5. An electronic camera comprising:
an image sensor array to capture an image of a scene;
a flash mechanism to illuminate the scene during the image capture in accordance with a pulse-on time interval;
an exposure controller to operate the image sensor array with a shutter during the image capture, the shutter having an integration time interval,
wherein the exposure controller, responsive to a scene ambient lighting indicator, is to control the flash mechanism and the imaging sensor array for image capture so that
(a) when a bright scene is indicated, a first integration interval is set together with a first flash pulse-on interval, and (b) when a dark scene is indicated, a second integration interval is set together with a second flash pulse-on interval, the first integration interval being shorter than the second integration interval and the first flash pulse-on interval being longer than the second flash pulse-on interval.

6. The electronic camera of claim 5 wherein the shutter has a row overlap time interval that depends on the integration time interval, and wherein the controller sets the first flash pulse-on interval to be longer than the row overlap time interval when a bright scene is indicated, and the second flash pulse-on interval to be shorter than the row overlap time interval when a dark scene is indicated.

7. The electronic camera of claim 5 further comprising:
a light sensor to which the controller is coupled to derive said indicator.

8. The electronic camera of claim 7 wherein the light sensor is in a different integrated circuit die than the image sensor array.

9. The electronic camera of claim 5 wherein the flash mechanism comprises a light emitting diode (LED) flash lamp driven in accordance with the flash mechanism's pulse-on time interval.

10. The electronic camera of claim 5 wherein the exposure controller maintains the same integration time interval for all rows of the image sensor array, during the image capture.

11. The electronic camera of claim 5 wherein the shutter has a row overlap time interval that depends on the integration time interval, and wherein the controller centers the flash mechanism's pulse-on time interval in the row overlap time interval.

12. The electronic camera of claim 5 wherein the shutter has an exposure complete time interval that depends on the integration time interval, and
wherein the controller sets the first flash pulse-on interval to be as long as the exposure complete time interval when a bright scene is indicated, and the second flash pulse-on interval to be shorter than the exposure complete interval when a dark scene is indicated.

13. The electronic camera of claim 12 wherein the shutter has a row overlap time interval that depends on the integration time interval, and
wherein the controller sets the second flash pulse-on interval to be longer than row overlap time interval when a dark scene is indicated.

14. An article of manufacture comprising:
a non-transitory machine-readable medium having stored therein instructions that program a processor to signal an image sensor array to operate with a shutter during flash-illuminated capture of an image of a scene, the shutter having an integration time interval, and wherein the processor is to, responsive to a scene ambient lighting indicator, signal the flash-illuminated capture to be taken using a shorter integration interval when the scene is indicated to be bright rather than dark, along with a longer flash pulse-on interval when the scene is indicated to be bright rather than dark.

15. The article of manufacture of claim 14 wherein the stored instructions reflect that the shutter has a row overlap time interval that depends on the integration time interval,
and wherein the flash pulse-on interval is longer than the row overlap time interval when the scene is indicated to be bright, and shorter than the row overlap time interval when the scene is indicated to be dark.

16. The article of manufacture of claim 14 wherein the stored instructions program the processor to detect the level of ambient light in the scene using captured image data from the image sensor array itself, instead of using a separate ambient light sensor.

17. The article of manufacture of claim 14 wherein the stored instructions program the processor to derive said indicator from user input rather than a light sensor.

18. The article of manufacture of claim 14 wherein the stored instructions 1) reflect that the shutter has a row overlap time interval that depends on the integration, and 2) program the processor to center the flash pulse-on time interval within the row overlap time interval.

19. The article of manufacture of claim 14 wherein the stored instructions reflect that the shutter has an exposure complete time interval that depends on the integration time interval,
and wherein the stored instructions program the processor to set the flash pulse-on interval to be as long as the exposure complete time interval when the scene is indicated to be bright, and shorter than the exposure complete time interval when the scene is indicated to be dark.

20. The article of manufacture of claim 19 wherein the stored instructions reflect that the shutter has a row overlap time interval that depends on the integration time interval,
and wherein the stored instructions program the processor to set the flash pulse-on interval to be longer than the row overlap time interval when the scene is indicated to be dark.

* * * * *